United States Patent [19]

Gibbs et al.

[11] Patent Number: 5,283,794
[45] Date of Patent: Feb. 1, 1994

[54] LASER APPARATUS AND METHOD EMPLOYING FUZZY LOGIC BASED PULSE WIDTH MODULATION

[75] Inventors: David M. Gibbs, Apopka; Robert D. Fischer, Winter Park, both of Fla.

[73] Assignee: Litton Systems, Inc., Little Falls, N.J.

[21] Appl. No.: 24,078

[22] Filed: Mar. 1, 1993

[51] Int. Cl.⁵ .............................................. H01S 3/13
[52] U.S. Cl. ........................................ 372/30; 372/8; 372/38
[58] Field of Search .................... 372/30, 8, 29, 38

[56] References Cited

U.S. PATENT DOCUMENTS

| | | | |
|---|---|---|---|
| 3,641,459 | 2/1972 | Paoli et al. | 331/94.5 |
| 4,794,603 | 12/1988 | Koseki | 372/38 |
| 4,888,777 | 12/1989 | Takeyama | 372/38 |
| 4,998,257 | 3/1991 | On et al. | 372/38 |
| 5,140,601 | 8/1992 | Shimada et al. | 372/38 |
| 5,140,603 | 8/1982 | Anderson et al. | 372/31 |
| 5,144,631 | 9/1992 | Okino | 372/25 |
| 5,157,675 | 10/1992 | Takagi | 372/24 |

Primary Examiner—Léon Scott, Jr.
Attorney, Agent, or Firm—William M. Hobby, III

[57] ABSTRACT

A laser apparatus is provided in which a laser diode is driven with a plurality of drive pulses to generate a plurality of first laser pulses. Each first laser pulse occurs during a respective window and has a predetermined pulse width determined by a corresponding drive pulse. An electronic shutter which intercepts the laser beam is then opened in response to a trigger signal to permit a second laser pulse to be emitted from the laser rod during each window. The laser energy output of each of the second laser pulses from the laser rod is continuously monitored on a window by window basis to determine if the energy output of each of the second laser pulses exhibits a predetermined desired value. The energy output of the second laser pulse observed during each of the windows is then reported as a respective energy report signal set for each of the windows.

6 Claims, 5 Drawing Sheets

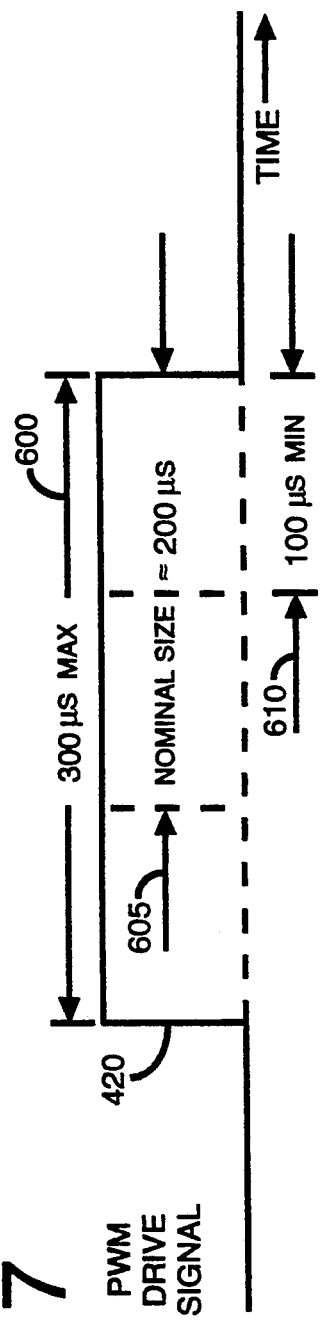
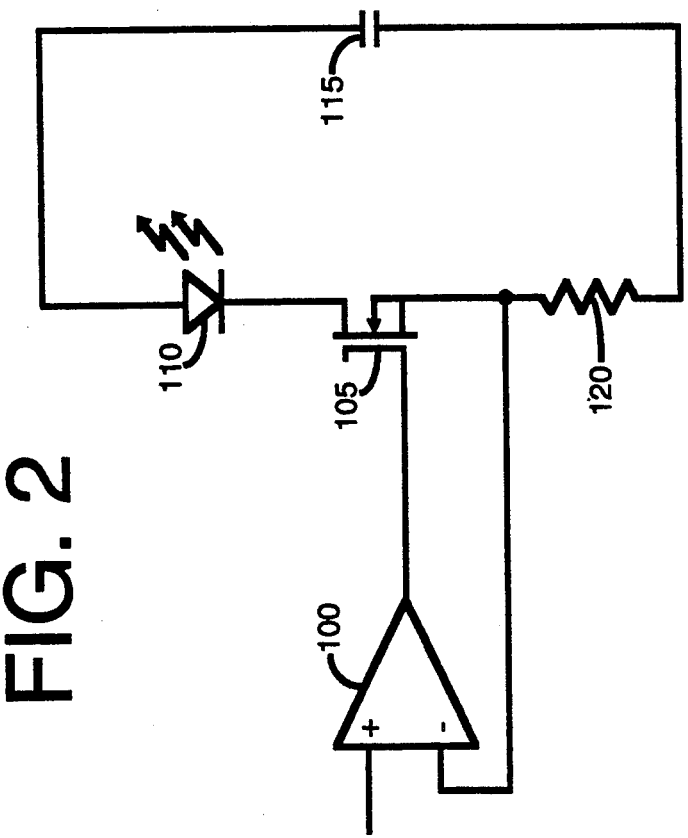

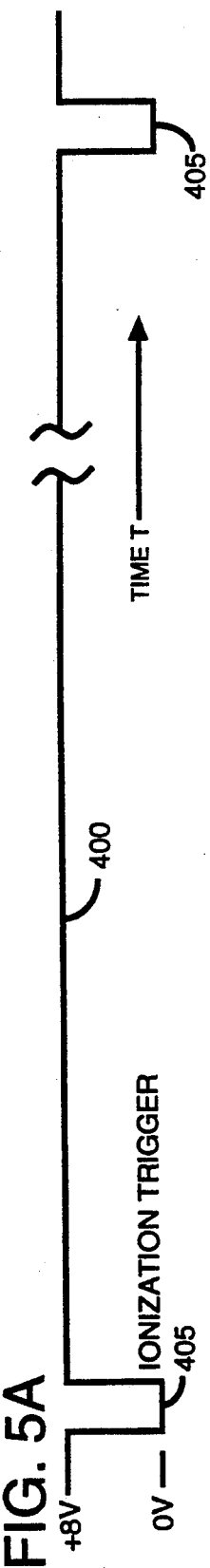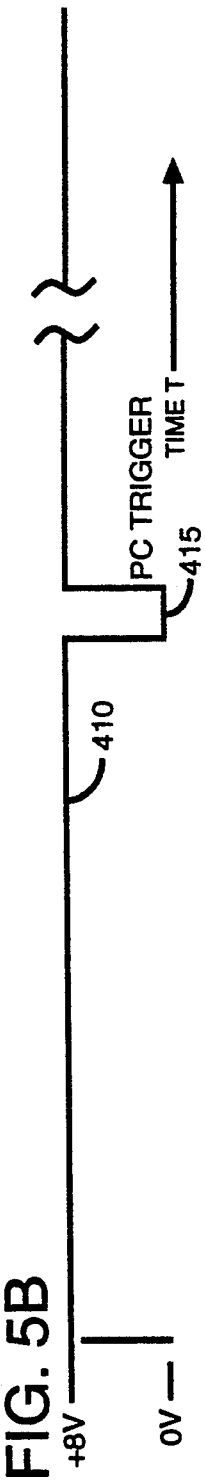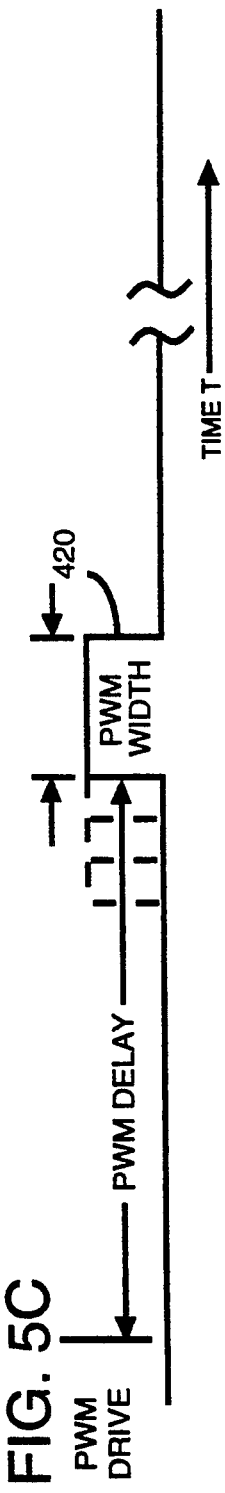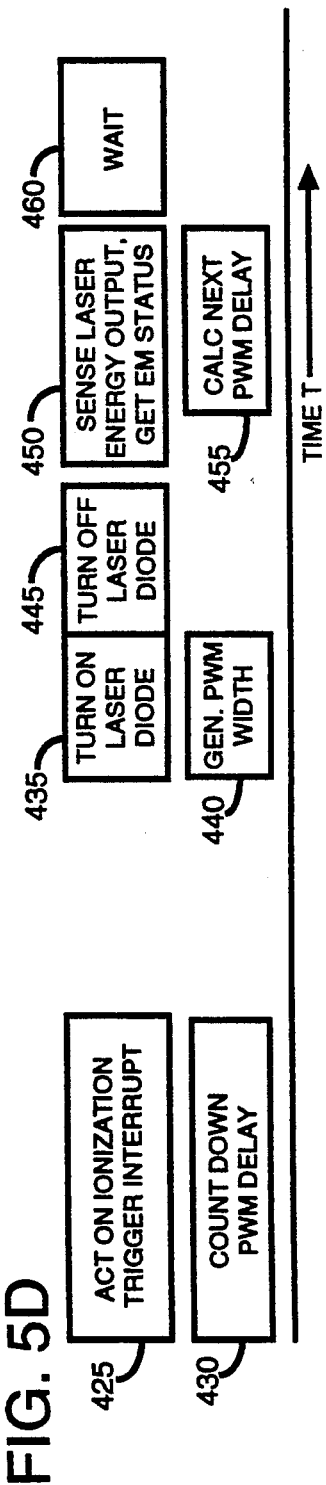

LASER APPARATUS AND METHOD EMPLOYING FUZZY LOGIC BASED PULSE WIDTH MODULATION

CROSS REFERENCE TO RELATED PATENT APPLICATIONS

This patent application is related to the copending patent application entitled "Laser Apparatus Employing Digital Filter Controlled Pulse Width Modulation", Serial No. (to be assigned), filed concurrently herewith and having the same assignee.

BACKGROUND OF THE INVENTION

This invention relates in general to drive circuits for laser apparatus and, more particularly, to pulse width modulation drive circuits for pulsed diode lasers.

Before discussing a conventional laser diode drive circuit, a conventional drive circuit 10 for a flashlamp-type laser transmitter 15 is shown in FIG. 1 for comparison purposes. The laser transmitter includes a flashlamp which excites a laser rod (both not shown). The transmitter also includes an energy monitor 20 which generates an ENERGY DATA output signal representative of the amplitude of the laser transmitter's optical output. The ENERGY DATA signal is fed through a transmitter electronics module 25 as an ENERGY STATUS signal. The ENERGY STATUS signal is supplied to a laser electronics module 30 which generates a high voltage adjust signal (HV Adjust). The HV ADJUST signal is fed to a programmable high voltage power supply, the output PROG. HV signal (pump voltage level) of which varies in accordance with the supplied HV ADJUST signal. The PROG. HV output signal (pump voltage level) is supplied to a pulse forming network (PFN) 40 including a capacitor in transmitter electronics module 25. The output of pulse forming network 40 supplies an ionization/PFN signal to laser transmitter 15 to drive the flashlamp exciter therein.

The drive circuit of FIG. 1 employs a control loop to adjust the output of the laser transmitter in the manner now described. The optical energy output of the laser transmitter is dependent on the pump voltage level (PROG. HV) supplied to the pulse forming network capacitor in the transmitter electronics module. The pump voltage level (PROG. HV) is programmed by, or controlled, by the present value of the HV Adjust signal generated by the laser electronics module. More specifically, using ENERGY DATA information sent back from the energy monitor in the laser transmitter (via the ENERGY DATA serial word data), an algorithm in the laser electronics module determines what adjustment of the pump voltage level (PROG. HV), if any, is needed to maintain a constant desired level of output energy. Thus, in this particular example wherein the laser transmitter includes a flashlamp cavity box, the optical output of the laser transmitter is maintained at a relatively constant amplitude by appropriately varying the pump voltage or drive voltage which is supplied to the laser flashlamp.

In contrast to the above described control loop of FIG. 1 wherein voltage is used to control the output of the flash lamp type laser transmitter, FIG. 2 shows a control loop and drive circuit which employs current to control the output of a laser diode type laser transmitter. FIG. 2 shows a laser diode driver circuit including an operational amplifier 100, the output of which is coupled to drive a field effect transistor 105 which is coupled in series with a laser diode 110, an energy storing capacitor 115 and a resistor 120. As noted above, one conventional approach to varying the output energy of the laser diode is to vary the amplitude of the current supplied to the laser diode. Another conventional technique for varying the output energy of the laser diode is to vary the pulse width of the input drive signal supplied to the input of the drive circuit at operational amplifier 100. Within certain bounds, the longer the pulse width supplied to the laser diode, the greater is the output which is generated by the laser up to the point of saturation. This is called pulse width modulation.

Unfortunately, conventional laser diode drive circuits such as shown in FIG. 2 do not enable the laser to stabilize quickly enough upon startup for some applications such as laser designator rangefinders, for example. Moreover, such drive circuits do not compensate for aging effects of the laser diode or other irregularities which enter the laser system. Also, temperature effects cause laser diode output wavelength shifts which, in general, decouple from the absorption region of the lasing medium (Nd:YAG rod) resulting in lower laser system output. Optics degradation, cooling medium "fogging" (if cooling the volume between laser diodes and lasing medium), and thermal effects on the lasing medium can result in undesired laser system output energy shifting when using laser diode drive circuits such as that in FIG. 2.

SUMMARY OF THE INVENTION

One object of the present invention is to provide a pulse width modulation drive circuit for a laser diode type laser which causes the laser to stabilize very quickly upon turn on.

Another object of the present invention is to provide a pulse width modulation drive circuit for a laser diode type laser which compensates for aging effects of the laser diode.

Yet another object of the present invention is to provide a pulse width modulation drive circuit for a laser diode type laser which compensates for the laser energy output shifting which results from undesired thermal effects and other irregularities in the laser diode system.

Still another object of the present invention is to provide a laser system wherein the timing between successive laser output pulses is precisely controlled.

In accordance with the present invention, a laser apparatus is provided including a semiconductor laser source for generating a plurality of first laser pulses in response to a drive signal, each of the first laser pulses having a pulse width which varies with the width of a respective drive pulse in the drive signal, each of the first laser pulses being spaced apart in time and occurring in a respective window. The laser apparatus also includes a laser rod positioned such that the semiconductor laser source pumps the laser rod to produce a laser beam. The laser apparatus further includes an electronic shutter, situated to intercept the laser beam, which opens for a predetermined amount of time in response to a trigger signal during each window to permit emission of a second laser pulse of predetermined duration, a plurality of second laser pulses thus being emitted by the shutter, each of the second laser pulses being emitted during the same respective window as a corresponding first laser pulse. The apparatus still further includes an energy monitor for continuously monitoring the energy level of the second laser pulses and reporting the energy level as an energy report signal. The apparatus also includes a controller, coupled to the energy monitor, for generating the drive signal in response to the energy report signal, the drive signal including a plurality of drive pulses, the pulse width of each of the drive pulses being dependent on the energy report signal and being continuously updated in response to the energy report signal, the controller being coupled to the semiconductor laser source to provide the drive signal thereto to continuously control the width of the first laser pulses generated by the semiconductor laser source.

BRIEF DESCRIPTION OF THE DRAWINGS

The features of the invention believed to be novel are specifically set forth in the appended claims. However, the invention itself, both as to its structure and method of operation, may best be understood by referring to the following description and the accompanying drawings.

FIG. 2 is a schematic diagram of a conventional control circuit which varies a laser diode's current and pulse width to control the output energy of a laser diode type laser system.

FIG. 4 is a chart showing the possible logic states of the fuzzy logic report signal employed by the laser energy output monitor used by the present invention.

FIG. 5A is a time vs. voltage graph of the IONIZATION TRIGGER timing signal employed by the laser apparatus of FIG. 3.

FIG. 5B is a time vs. voltage graph of the PC TRIGGER timing signal employed by the laser apparatus of FIG. 3.

FIG. 5C is a time vs. voltage graph of the PWM DRIVE signal employed by the laser apparatus of FIG. 3.

FIG. 5D is a time line event diagram for the software events carried out by the microcontroller in the laser apparatus of FIG. 3.

FIG. 7 is a time vs. voltage graph of a single PWM DRIVE signal pulse.

DETAILED DESCRIPTION OF THE INVENTION

Figure 1:
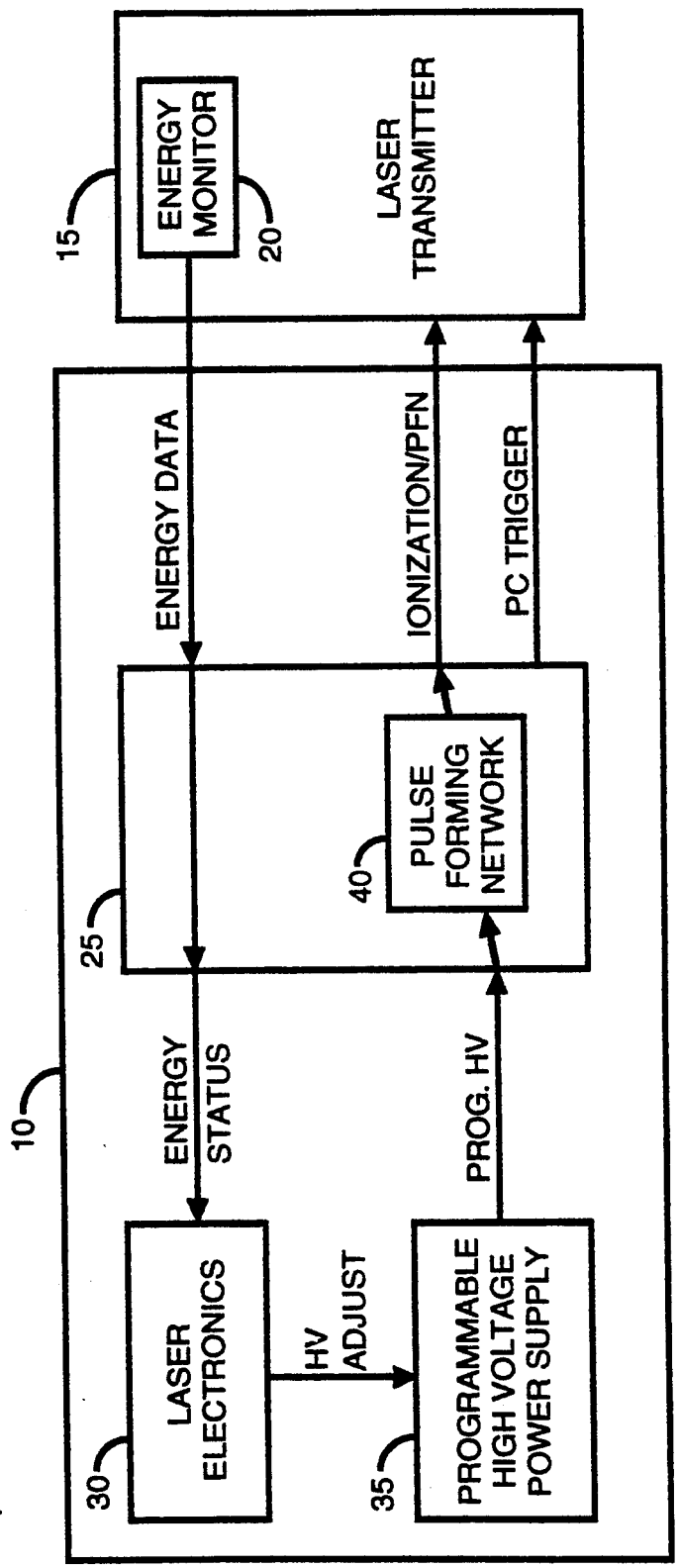
FIG. 1 is a block diagram of a conventional laser system employing a voltage control type control loop for controlling the output energy of a flash lamp type laser system.
Figure 3:
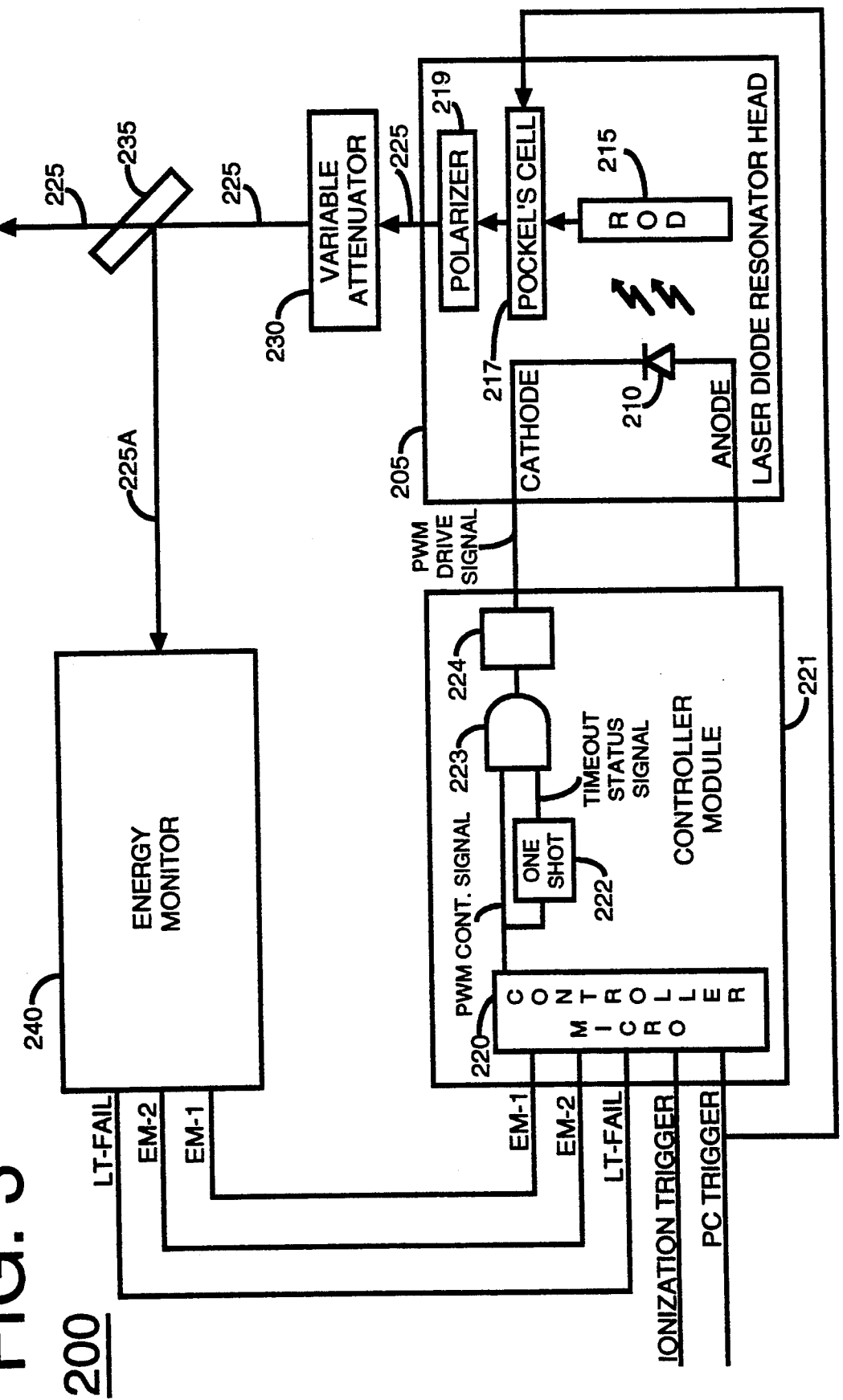
FIG. 3 is a block diagram of a fuzzy logic implementation of the laser diode laser system of the present invention.

FIG. 3 shows a block diagram of a fuzzy logic implementation of the laser system of the present invention as laser system 200. Laser system 200 includes a laser diode resonator head 205 having a laser diode 210 which excites a laser rod 215. Laser diode 210 includes ANODE and CATHODE inputs as indicated. A microcontroller 220 included in controller module 221 is coupled to the ANODE and CATHODE inputs to provide diode 210 with a specially generated, pulse width modulated PWM DRIVE signal as will be described in more detail subsequently. In actual practice, laser diode 210 is a matrix of laser diodes which acting together generate sufficient energy to pump and excite laser rod 215.

When excited by laser diode 210, laser rod 215 generates a laser beam 225 which is passed through a variable attenuator 230 to a beam splitter 235. Beam splitter 235 passes most of laser beam 225 with little attenuation; however, a small sample of the beam is deflected as sample beam 225A to energy monitor 240. Attenuator 230 is used to introduce output variations into the output energy of laser head 205 for testing purposes and in actual practice may be eliminated. Laser beam 225 which exits laser diode head 205 is actually a series of laser pulses and will be hereafter referred to as laser pulses 225 as will be discussed in more detail later.

Energy monitor 240 monitors the output energy of laser head 205 and provides a series of output signals which indicate the laser output energy level at predetermined sample times. One energy monitor which may be used as energy monitor 240 is the Lantirn Model 60511645 available from Litton Laser Systems. In this particular example, energy monitor 240 generates three output signals LT-FAIL, EM-1 and EM-2 which taken together indicate the output energy level of the laser within certain energy ranges during predetermined sample windows.

More particularly, as seen in the chart of FIG. 4, the LT-FAIL, EM-2 and EM-1 energy report signals assume different digital states which indicate the current energy output level of the laser. FIG. 4 is a chart which depicts the digital states of the LT-FAIL, EM-2 and EM-1 signals generated by energy monitor 240 in response to the various laser output energies observed by the monitor. For example, when the LT-FAIL, EM-2 and EM-1 signals exhibit respective states of 000,001 or 010, then the observed laser power output is defined to be so low that it is "not available" or exhibits an N/A status. It is noted that an energy output level of 100% to 105% is a predetermined desired output energy level for the laser pulses generated by laser rod 215. When the LT-FAIL, EM-2 and EM-1 signals exhibit respective levels of 011, then the observed output laser energy is less than 50% and is given an LT FAIL status. When the LT-FAIL, EM-2 and EM-1 signals exhibit respective levels of 100, then the observed output laser energy is within the range of 50% to 80%. When the LT-FAIL, EM-2 and EM-1 signals exhibit respective levels of 101, then the observed output laser energy is within the range of 80% to 100%. When the LT-FAIL, EM-2 and EM-1 signals exhibit respective levels of 110, then the observed output laser energy is within the range of 100% to 105%. However, when the LT-FAIL, EM-2 and EM-1 signals exhibit respective levels of 111, then the observed output energy is above 105%.

Energy monitor 240 employs so-called "fuzzy logic" in that it reports the monitored laser energy output levels to be within certain percentage ranges during each sample interval. Those skilled in the art will appreciate that other energy monitors using different energy report signals than those described above may be used to report the laser energy output of laser head 205 during predetermined time intervals instead of the particular energy monitor discussed here for purposes of example.

Returning again to FIG. 3, the LT-FAIL, EM-1 and EM-2 energy report signals generated by energy monitor 240 are provided to corresponding inputs of microcontroller 220 in controller module 221. In this manner, microcontroller 220 is apprised of the energy output of laser head 205 within a certain fuzzy power output range during each sample time interval or window.

Microcontroller 220 also includes an IONIZATION TRIGGER input and a PC TRIGGER input to which a conventional IONIZATION TRIGGER timing signal and a conventional PC TRIGGER timing signal are provided respectively. The disclosed laser system advantageously makes use of the IONIZATION TRIGGER timing signal and a PC TRIGGER signal already found in conventional laser systems. The IONIZATION TRIGGER timing signal is a timing signal employed in flashlamp laser systems which instructs the system as to the appropriate time to start applying energy to the flashlamp. The PC TRIGGER timing signal is a timing signal also employed in flashlamp laser systems which instructs a Pockel's cell electronic shutter (Pockel's cell plus polarizer) when to momentarily open to permit the laser beam pulse to exit. Those skilled in the art will appreciate that although these particular timing signals are employed in the present laser system, equivalent timing signals could also be employed.

In more detail, laser system 200 of the present invention includes a Pockel's cell 217 and a polarizer 219 which are positioned in the path of laser pulse 225 as shown in FIG. 3. The PC TRIGGER signal is provided to Pockel's cell 217 as indicated. Pockel's cell 217 and polarizer 219 together act as an electronic shutter which momentarily opens upon the instruction of the PC TRIGGER signal to let a pulse of coherent light out of laser head 205 as laser pulse 225. This occurs in time after laser diode 210 has excited and pumped laser rod 215. The PC TRIGGER signal thus controls the time at which laser system 200 emits each laser output pulse 225.

FIG. 5A is a timing diagram of the IONIZATION TRIGGER signal showing voltage vs. time. The IONIZATION TRIGGER signal 400 is one of the two main timing signals employed by microcontroller 220 to control the timing of the laser pulse emitted by laser head 205. The IONIZATION TRIGGER signal includes a periodic, negativing going IONIZATION TRIGGER pulse 405 which is shown in FIG. 5A. In this particular embodiment of the invention, the IONIZATION TRIGGER pulse is a 20 Hz pulse signal with a period of 50 mS. The width or duration of the IONIZATION TRIGGER pulse is 20 $\mu S \pm 5$ $\mu S$.

FIG. 5B is a timing diagram of the PC TRIGGER signal showing voltage vs. time. The PC TRIGGER signal 410 is the second of the two main timing signals employed by microcontroller 220 to control the timing of laser pulse 225 emitted by laser head 205. The PC TRIGGER signal includes a periodic PC trigger pulse 415 which is shown in FIG. 5B. In this particular embodiment, there is fixed relation between the time of each IONIZATION TRIGGER pulse and a corresponding PC TRIGGER pulse. More specifically, the time difference between the leading negative-going edge of IONIZATION TRIGGER pulse 405 and the leading negative going edge of PC TRIGGER pulse 415 is a fixed difference of 5.148 mS $\pm 0.510$ mS. The width or duration of the PC TRIGGER pulse is 20 $\mu S \pm 5$ $\mu S$.

FIG. 5C is a timing diagram of the pulse width modulated PWM DRIVE signal which is applied to laser diode head 205. The prominent feature of the PWM DRIVE signal is the PWM pulse 420 which drives laser diode 210. Laser diode 210 is turned on for the pulse width or duration of PWM pulse 420. The pulse width of PWM pulse 420 is varied from pulse to pulse, or shot to shot, under the direction of microcontroller 220 as needed to maintain the desired laser output pulse 225 energy level. The variable width nature of PWM pulse 420 is denoted in FIG. 5C by dashed lines to the left of pulse 420 which graphically indicate different pulse widths. It is noted that the falling edge of PWM DRIVE pulse 420 is fixed in time to coincide with the leading edge of the PC TRIGGER signal of FIG. 5B. The width of PWM pulse 420 is varied by extending the starting time or leading edge of the PWM pulse forward and backward in time in accordance with a variable PWM DELAY time as indicated in FIG. 5C. A larger PWM DELAY time results in a narrower PWM pulse whereas a smaller PWM delay results in a wider PWM pulse as explained later in more detail. The purpose in adjusting the leading edge of the pulse width of the PWM DRIVE signal is to maintain the relative timing between PC TRIGGER 415 and IONIZATION TRIGGER 405. This is necessitated by the fact that the spacing between each of the successive laser pulses 225 must be tightly controlled for typical laser operations such as target designation and other timing considerations. If the trailing edge of the PWM DRIVE signal were allowed to bounce around on a laser shot to laser shot basis due to the controlling action of the PWM DRIVE signal, the interpulse period between laser pulses would not be controlled. This condition is not desirable and is avoided by the present invention.

It is noted that the timing between successive Ionization Trigger pulses is precisely controlled and that is is desirable to maintain the interval therebetween constant. Correspondingly, the leading edge of each PC trigger pulse is precisely controlled and aligned in time with respect to a corresponding Ionization Trigger pulse as shown in FIGS. 5A and 5B. Also, the PWM DRIVE pulse 420 must end at the leading edge of the PC trigger pulse 415.

FIG. 5D is a time line event diagram which provides an overview of the activities conducted by microcontroller 220 over time on a laser pulse per laser pulse basis. Events depicted in FIG. 5D are vertically aligned with corresponding events and timing signals depicted in FIGS. 5A–5C. More specifically, microcontroller 220 monitors its inputs for an IONIZATION TRIGGER event or interrupt 425 or other equivalent trigger signal which indicates to microcontroller 220 that a laser pulse cycle or window is to commence. Each laser pulse cycle or window commences with such an IONIZATION TRIGGER event or equivalent. Microcontroller 220 then counts down from a predetermined PWM delay time count to determine the time to commence PWM pulse 420 as indicated at event 430. Laser diode 210 is turned on as indicated at event 435 and remains on for the duration of the PWM pulse width (PWM DRIVE signal) as indicated at event 440. Laser rod 215 is thus pumped by laser diode 210 for the duration of the PWM DRIVE signal pulse 420 width. This action causes laser rod 215 to generate a laser beam.

Upon microcontroller 220 receiving the PC TRIGGER signal or other equivalent timing signal, laser diode 210 is turned off and the laser pulse from laser diode 210 ends as indicated at event 445. The electronic shutter formed by Pockel's cell 217 and polarizer 219 is then momentarily opened (not shown on the time line of FIG. 5D) to permit a brief laser output pulse 225 to be emitted by laser head 205 as discussed in more detail later.

The energy output of laser head 205, namely laser output pulse 225, is monitored or sensed at event 450 and the EM report signals are retrieved by microcontroller 220. It is noted that event 450 actually occurs in time during the time window in which each diode laser pulse is being generated or very soon thereafter.

Based upon the sensed laser energy output level indicated by these EM report signals, microcontroller 220 tests to see if the laser output energy 225 is too small or too large in the manner later described. Based on this determination, a new PWM delay time is calculated at event 455 and stored in microcontroller 220 for use in generation of the next laser pulse. The new PWM delay time is selected such that the next PWM DRIVE signal pulse will have an appropriate PWM width or duration to drive the laser head energy output to the desired energy level. Microcontroller 220 then waits at event 460 for the next laser timing signal, namely the IONIZATION TRIGGER signal or equivalent before counting down the next PWM delay and generating the next PWM DRIVE signal pulse. In this manner, the laser system is driven in closed-loop fashion so that subsequent laser head output pulses 225 will have the desired output energy.

Figure 6:
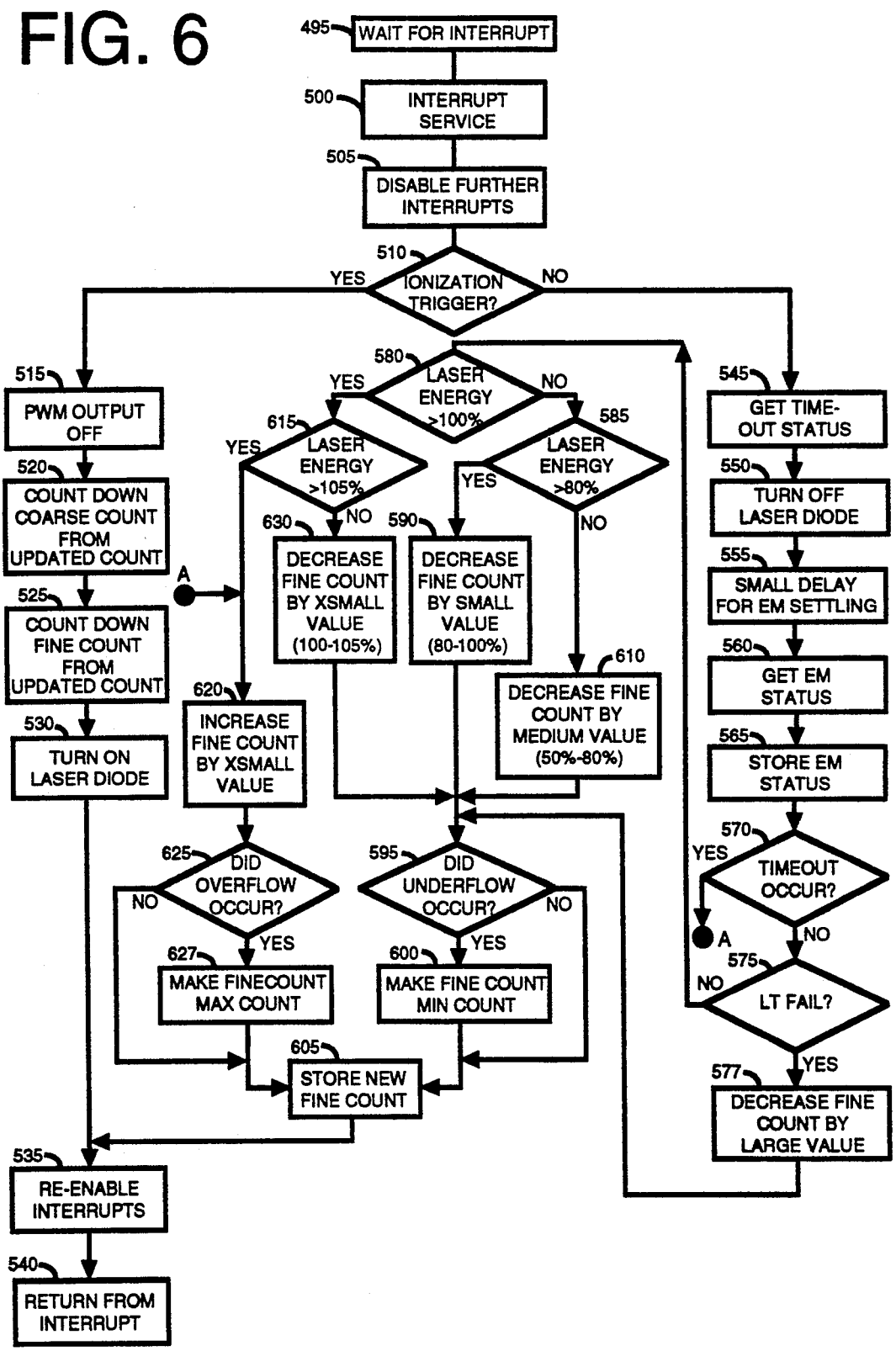
FIG. 6 is a flow chart depicting the process flow of the steps implemented by the microcontroller of the laser apparatus of the present invention.

FIG. 6 is a flow chart which depicts the process flow implemented by microcontroller 220 to control laser system 200. In actual practice, a Motorola Model 68HC05 microcontroller is employed as microcontroller 220. This microcontroller includes an on-board ROM for storing the program embodied in the flow chart of FIG. 6. This microcontroller also includes an on-board RAM for storing temporary values of counts and energy monitor inputs.

Microcontroller 220 continuously monitors its input lines for interrupts as indicated at block 495 in the flow chart of FIG. 6. In the embodiment discussed above, two types of interrupts are possible, namely an IONIZATION TRIGGER interrupt and a PC TRIGGER interrupt. When an interrupt is received by microcontroller 220, interrupt service is performed at block 500 and further interrupts are temporarily disabled as indicated at block 505. A test is then conducted at decision block 510 to determine if the present interrupt is an IONIZATION TRIGGER interrupt or a PC TRIGGER interrupt. If the interrupt is an IONIZATION TRIGGER interrupt, the microcontroller branches to the leftmost path of the flow chart and laser diode 210 is turned off at block 515 to prevent falsing. A count down from a DELAY COUNT NUMBER corresponding to the PWM DELAY time commences at block 520. This is a coarse count used to approximate but not quite reach the desired delay. A second count which is a FINE COUNT commences at block 525 from another predetermined count number to actually zero-in on and reach the desired total delay. The laser diode is then turned on at block 530 when microcontroller 220 has counted down through the entire time corresponding to the stored delay. The laser diode thus commences generation of a light signal which excites laser rod 215 to generate a coherent light signal or laser beam.

The interrupts are re-enabled at block 535 and microcontroller 220 returns from processing the interrupt at block 540. Microcontroller 220 waits for the next interrupt at block 495. Upon receiving the next interrupt, which is expected to be the PC TRIGGER interrupt, interrupt service is again commenced at block 500 and further interrupts are again disabled at block 505. The microcontroller checks at block 510 to determine whether the present interrupt is an IONIZATION TRIGGER interrupt or a PC TRIGGER interrupt. If the interrupt is a PC TRIGGER interrupt, then the microcontroller branches to the rightmost path of the flowchart and the TIME OUT status is acquired at block 545.

Digressing momentarily from the discussion of the flow chart of FIG. 6, the nature of the TIME OUT signal and the reasons therefor are now discussed. It is noted that a practical limitation on the duration of the pulse width supplied to the laser diode or diodes is included in the laser system of the present invention. In other words, a "safety net" is provided external to the microcontroller to prevent inadvertent overdriving of the laser diode. Typical maximum pulse widths of the PWM DRIVE signal provided to the laser diodes 210 in FIG. 3 are approximately 300 $\mu$S.

Further increases in the pulse width of the PWM DRIVE SIGNAL provided to the laser diode could damage or destroy the laser diode. To prevent this undesired situation, the PWM CONTROL signal which is provided by microcontroller 220 is ANDed with a TIMEOUT STATUS signal at AND gate 221 to actually generate the PWM DRIVE pulse which is supplied to the laser diodes. The TIMEOUT STATUS signal goes high as soon as the PWM CONTROL signal goes high and AND gate 221 therefor generates the corresponding output. The TIMEOUT STATUS signal is generated by a one shot multi-vibrator 222 which is triggered by the PWM CONTROL signal provided at the output of the microcontroller. At the trigger (PWM SIGNAL), the output signal of one shot 222, namely the TIMEOUT STATUS signal goes high for a duration of approximately 300 $\mu$S and then returns low again. As long as the PWM SIGNAL and the TIMEOUT STATUS signal are high, AND gate 223 outputs the PWM DRIVE signal to a power switch and capacitor drive network 224 which provides the PWM DRIVE signal to laser diodes 210. It is noted that the PWM DRIVE signal is substantially the same as the PWM CONTROL signal in timing and duration except as affected by the time out status circuit formed by elements 222, 223 and 224.

The drive circuit depicted in FIG. 2 may be employed as drive network 224 in one embodiment of the invention. The purpose of drive network 224 is now briefly discussed. The PWM CONTROL signal which is generated by microcontroller 220 is a logic signal, typically 5 volts or less, which does not have sufficient energy to drive laser diode 210 directly. Thus, to permit the PWM CONTROL signal to drive laser diode 210, the PWM CONTROL signal is provided to drive network 224 which transforms the PWM CONTROL signal into a PWM DRIVE signal with sufficient energy to drive laser diode 210.

Microcontroller 220 monitors the TIMEOUT STATUS to see if it is currently trying to drive the pulse width beyond practical limits. If, at PC TRIGGER 415, the TIMEOUT STATUS signal is low, then microcontroller 220 has "maxed out" the pulse width of PWM CONTROL signal and the corresponding PWM DRIVE signal. Under these circumstances, the laser system is outputting the maximum energy level it can.

The software decision tree which is incorporated in the flowchart of FIG. 6 and which is implemented by microcontroller 220 monitors the TIMEOUT STATUS signal. For instance, if the laser system output cannot provide the desired level of energy at the 300 $\mu$S pulse width (of the PWM CONTROL signal and the corresponding PWM DRIVE signal) due to catastrophic causes, then microcontroller 220 would naturally want to widen the pulse width. If the so-called "safety net" signal, TIMEOUT STATUS, goes low before PC TRIGGER 415 occurs, a "gap" is then occurring between the trailing edge of the PWM DRIVE signal 420 and the leading edge of PC TRIGGER 415. Consequently, the lasing medium of rod 215 starts to lose stored energy due to fluorescence.

When the PC trigger signal 415 finally does occur, the energy stored in rod 215 due to the laser diode pulsing action (or "pumping") has deteriorated somewhat below what is maximally possible due to this "gap" in time between PWM DRIVE and PC TRIGGER. Therefore, even as microcontroller 220 tries to widen the pulse width to compensate, the energy output of the laser system at laser pulse 225 actually decreases further. If not monitored and controlled, this undesirable situation would deteriorate even further until the output of the laser system is essentially zero and the actual PWM pulse (ie., the PWM CONTROL pulse and the corresponding PWM DRIVE pulse) would occur on the time line of FIGS. 5A-5D immediately after IONIZATION TRIGGER 405.

The present invention provides for this situation. More particularly, when the above described situation starts to occur, the TIMEOUT STATUS signal tells microcontroller 220 that the PWM DRIVE signal has "maxed out" or assumed a maximum possible value. At this point, the delay time count is incremented or increased by the smallest resolution adjustment (XSMALL) possible as described later in more detail. This in effect pushes the PWM DRIVE signal 420 back to the right on the time line of FIGS. 5A-5D toward PC TRIGGER signal 415. Taking this action assures that, first, the maximum pulse width can be safely attained, and second, maximum laser output energy at laser pulse 225 can be maintained even if it not at the level at which microcontroller 220 and energy monitor 240 are programmed to control.

Continuing again with the discussion of the flow chart of FIG. 6, it is noted that after TIME OUT status is acquired at block 545, the laser diode is then turned off at block 550 and the laser diode pulse is terminated. A laser diode pulse having its pulse width controlled by microcontroller 220 has thus been generated.

Microcontroller 220 then waits at delay block 555 for a small delay of approximately 6 $\mu S$ to pass to permit the LT-FAIL, EM-1 and EM-2 energy report signals generated by energy monitor 240 during the laser pulse to settle. After the delay has expired, microcontroller 220 gets the present status of the LT-FAIL, EM-1 and EM-2 energy report signals at block 560 and stores that status in the on-board RAM within the microcontroller at block 565.

A test is then conducted at decision block 570 to determine if a timeout has occurred. If timeout has not occurred, then process flow continues to decision block 575 where a determination is made to see if the LT FAIL report signal from energy monitor 240 is a 1 (indicating that laser energy was detected) or a 0 (indicating failure, namely, that laser energy was less than a predetermined failure level, for example, 50%) If such a failure is not detected at block 575, then process flow continues to decision block 580 at which a determination is made to see if the three report signals (LT FAIL, EM2 and EM1) together indicate the laser energy is over 100%. If the laser energy is not over 100%, then flow continues to decision block 585 which checks the three report signals to see if laser energy is over 80%. If it is found that the laser energy is over 80%, then the laser energy is between 80% and 100% and FINE COUNT is decreased by SMALL VALUE at block 590. FINE COUNT is defined to be a variable which gets updated at every laser pulse to count down during the FINE COUNT portion, of the flowchart, namely during blocks 430 and 525. SMALL VALUE is defined to be the adjustment size for PWM DRIVE signal 420. It is noted that in one embodiment of the invention, SMALL VALUE is approximately 6 $\mu S$ or approximately 3% of the nominal size pulse width of the PWM DRIVE signal. In this example, which is illustrated in the PWM DRIVE signal vs. time graph of FIG. 7, the maximum size 600 of the pulse width of the PWM DRIVE signal is approximately 300 $\mu S$, the nominal size 605 of the PWM DRIVE pulse width is approximately 200 $\mu S$ and the minimum size 610 of the PWM DRIVE pulse width is approximately 100 $\mu S$.

If underflow is determined to occur at decision block 595, then the present FINE COUNT is assigned a value of MIN COUNT at block 600. More particularly, underflow is determined to prevent FINE COUNT from becoming too small since there is a practical limit on how wide it would be desired to make the PWM DRIVE pulse width. MIN COUNT is defined to be the smallest practical count that would widen the PWM DRIVE signal pulse width barring an interruption from the timeout status signal.

The resultant New FINE COUNT is then stored in memory at block 605 and flow continues back to block 535 where the interrupts are re-enabled and then to block 540 where the microcontroller returns from the interrupt. If underflow is not determined to occur at decision block 595, then flow continues directly to block 605 without an adjustment to FINE COUNT.

Returning to decision block 585, if it is determined that laser energy output during the last pulse was not over 80%, then the laser output energy of laser output pulse 225 must be between 50% and 80% and flow continues to block 610 where FINE COUNT is decreased by a MEDIUM VALUE. MEDIUM VALUE as a medium or middle value adjustment size in the time width of the PWM DRIVE signal. In this embodiment, MEDIUM VALUE is equal to approximately 24 $\mu S$ or about 12% of the nominal size of the PWM DRIVE pulse width (200 $\mu S$). Flow again continues to underflow determination block 595 as discussed earlier.

Returning to decision block 580, if it is determined that laser energy output during the last pulse was in excess of 100%, then a check is made at decision block 615 to determine if the laser energy output is over 105%. If the laser energy output is found not to be in excess of 105%, then laser energy must be between 100 and 105% and FINE COUNT is decreased by SMALL VALUE and flow again continues to underflow determination block 595.

If decision block 615 determines that the laser energy output of the last pulse was over 105%, then FINE COUNT is increased by SMALL VALUE at block 620. A determination is then made at overflow determination block 625 to see if overflow of FINE COUNT has occurred. More particular, decision block 615 checks to insure that a practical maximum delay has been implemented. This prevents the pulse width of the PWM DRIVE signal from becoming too narrow (that is, less than approximately 100 $\mu S$). It is noted that, if the pulse width of the PWM DRIVE signal were to become less than approximately 100 μS, then as a practical matter the laser system would not emit a significant amount of light per pulse. If there is an energy monitor status indication of greater than 105%, which would cause adjustment of FINE COUNT to increase, the practical maximum limit is defined at the level called overflow. At this point, the FINE COUNT variable is clamped or limited to MAX COUNT and the resultant pulse width of the PWM DRIVE signal is approximately 100 μS.

Returning again to the flow chart of FIG. 6, if overflow is found to have occurred, then FINE COUNT assumes the value of MAX Count at block 627 and flow continues to block 605 where the new value of FINE COUNT is stored. If, however, overflow was not detected at block 625, then flow continues directly to block 605 without further adjustment to FINE COUNT.

However, if decision block 615 determines that the laser energy output of the last pulse was not in excess of 105%, then FINE COUNT is decreased by SMALL VALUE at block 630 and flow continues to underflow check block 595.

Returning to decision block 570, if it was determined at block 570 that a timeout occurred, then flow continues as indicated at connector A to block 620 at which FINE COUNT is increased by SMALL VALUE. Flow then continues to overflow check block 625.

Returning to decision block 575, if it was determined at decision block 575 that the LT FAIL report signal exhibited a 0 value indicating laser output energy failure, then FINE COUNT is decreased by the amount LARGE VALUE at block 577. LARGE VALUE is defined to be an adjustment size to the width of the PWM DRIVE signal and is approximately 30 μS or about 15% of the nominal PWM DRIVE signal pulse width in this embodiment of the invention. Flow then continues to decision block 595 at which the underflow condition is tested.

For purposes of completeness and with reference to both FIGS. 3 and 6, an example of the operation of laser system 200 from the time of initialization until generation of a laser diode pulse and a resultant laser output pulse 225 is now discussed in summary form with sample variable values. On initial startup of the system, the system is initialized. When an IONIZATION SIGNAL 405 is found by the microcontroller at block 405 of the flow chart of FIG. 6, this event causes an initial value count (COURSE START and FINE START) to be counted. This results in a pulse width (PWM DRIVE signal) of approximately 200 μS taking into account the nominal time between the IONIZATION TRIGGER signal 405 and the PC TRIGGER signal 415. The resultant energy transferred to the lasing medium, namely laser rod 215, will cause a roughly proportional amount of energy to be released from the laser system as a very high power, short duration laser pulse 225 when Pockel's cell 217 opens at PC TRIGGER 415. When energy monitor 240 senses the small fraction of energy 225A from the laser system output, energy monitor 240 sets the status signals as one of the conditions depicted in FIG. 4. Based on these status signals sent to microcontroller 220, the delay count is adjusted up or down to maintain the laser system output pulse 225 approximately at a desired energy level. For instance, if the sensed energy of the laser system output pulse 225 is between 80% and 100% as a result of the initial 200 μS wide PWM DRIVE pulse 420, then the process flow based on energy monitor 240 generating an output of 101 (see chart of FIG. 4) results in adjusting FINE COUNT by a SMALL VALUE at decision block 590. At this point, FINE COUNT is decreased by approximately 6 μS (3% of the nominal 200 μS pulse width). The delay count will now be 6 μS less on the next timing sequence and thus the PWM DRIVE pulse 420 leading edge will occur 6 μS earlier on the time line of FIG. 5C. This will result in a 206 μS wide PWM DRIVE signal pulse after PC TRIGGER 415 occurs.

The laser system output pulse 225 should increase in energy in this example. For purposes of this example, it will be assumed that this energy increase causes energy monitor 240 status lines to indicate a 100-105% energy level, namely "101". Microcontroller 220 would then execute decision block 630 at which FINE COUNT is further decreased by XSMALL. This results in FINE COUNT being decreased by 3 μS (1.5% of the nominal 200 μS pulse width) thus bringing the PWM DRIVE pulse width to 209 μS when PC TRIGGER occurs.

Now assuming that the above adjustment results in laser system output pulse 225 being greater than 105%, energy monitor 240 then indicates a "111" on its status lines. The decision tree set forth in the flow chart of FIG. 6 the flows to decision block 620 at which FINE COUNT is increased by XSMALL (3 μS). As a result, the pulse width of the PWM DRIVE signal will now be adjusted back to 206 μS. The next laser system output pulse 225 will likely cause energy monitor 240 to indicate "110" corresponding to 100 to 105% energy. Again, flow will reach block 630 where FINE COUNT is decreased by XSMALL causing the PWM DRIVE signal 420 to exhibit a duration of 209 μS.

At this point, it should be recognized that laser output pulse 225 will toggle around the 105% level with constant increasing and decreasing of the pulse width of the PWM DRIVE signal 420 on a shot to shot or pulse to pulse basis. However, microcontroller 220 makes large adjustments when the laser energy output 225 is far from the predetermined desired level (ie. significantly below the 105% energy output level). As the energy level of the laser output pulse 225 approaches 105%, the adjustment to FINE COUNT is made smaller to "zero in" on the desired output level. In the present embodiment, for levels of energy output significantly above 105%, no provisions are made for large adjustments although embodiments are possible which provide for this circumstance. Rather, for simplicity in the present embodiment, the pulse width of the PWM DRIVE signal is gradually reduced by XSMALL until the laser system output 225 starts to toggle around the 105% level. The more typical situation is where laser output pulse 225 is too low and in that case more adjustment capabilities are provided to the duration or pulse width of the PWM DRIVE signal.

If laser system 200 is stabilized around the 105% toggle point described above, and a disturbance (temperature shift, optics degradation, etc.) occurs, the energy level exhibited by laser output pulse 225 is automatically adjusted in the manner described above.

While a laser apparatus has been described above, it is clear that a method of operating the laser apparatus has also been disclosed. More particularly, that method includes the step of driving a semiconductor laser source with a plurality of drive pulses to generate a plurality of first laser pulses, each pulse having a predetermined pulse width determined by a corresponding drive pulse, each first laser pulse occurring during a respective window. The method also includes the step of pumping a laser rod with the first laser pulses to generate a laser beam. The method further includes the step of opening an electronic shutter which intercepts the laser beam to permit a second laser pulse to be emitted during each window, the electronic shutter opening in response to a trigger signal. The method of the invention still further includes the step of continuously monitoring the laser energy output associated with each of the second laser pulses on a window by window basis to determine if the energy output exhibits a predetermined desired value. The method also includes the step of adjusting the pulse width of successive drive pulses to control the pulse width of the first laser pulses and the energy output of corresponding respective second laser pulses.

The foregoing describes a pulse width modulated laser diode apparatus which stabilizes very quickly upon device turn on. The apparatus of the invention compensates for aging effects of the laser diode and other irregularities in the energy output of the laser diode system. The laser system continuously monitors the laser output pulses energy from the laser head on a pulse by pulse basis without stop. The laser system is continuously vigilant to irregularities and anomalies in the energy level of each laser output pulse from the laser head and continuously takes corrective action in accordance with the present invention.

While only certain preferred features of the invention have been shown by way of illustration, many modifications and changes will occur to those skilled in the art. It is, therefore, to be understood that the present claims are intended to cover all such modifications and changes which fall within the true spirit of the invention.

We claim:

1. A laser apparatus comprising:
   a semiconductor laser source for generating a plurality of first laser pulses in response to a drive signal, each of said first laser pulses having a pulse width which varies with the width of a respective drive pulse in said drive signal, each of said first laser pulses being spaced apart in time and occurring in a respective window;
   a laser rod positioned such that said semiconductor laser source pumps said laser rod to produce a laser beam;
   an electronic shutter, situated to intercept said laser beam, which opens for a predetermined amount of time in response to a trigger signal during each window to permit emission of a second laser pulse of predetermined duration, a plurality of second laser pulses thus being emitted by said shutter, each of said second laser pulses being emitted during the same respective window as a corresponding first laser pulse;
   an energy monitor for continuously monitoring the energy level of said second laser pulses and reporting said energy level as an energy report signal, and
   a controller, coupled to said energy monitor, for generating said drive signal in response to said energy report signal, said drive signal including a plurality of drive pulses, the pulse width of each of said drive pulses being dependent on said energy report signal and being continuously updated in response to said energy report signal, said controller being coupled to said semiconductor laser source to provide said drive signal thereto to continuously control the width of the first laser pulses generated by said semiconductor laser source.

2. The laser apparatus of claim 1 wherein said electronic shutter includes a Pockel's cell and a polarizer situated on a common axis, said trigger signal being provide to said Pockel's cell.

3. The laser apparatus of claim 1 wherein said electronic shutter includes a Pockel's cell and a polarizer situated on a common axis, said trigger signal being provide to said Pockel's cell.

4. A laser apparatus comprising:
   a semiconductor laser source for generating a plurality of first laser pulses in response to a drive signal, each of said first laser pulses having a pulse width which varies with the width of a respective drive pulse in said drive signal, each of said first laser pulses being generated during a respective time window;
   a laser rod positioned such that said semiconductor laser source pumps said laser rod to produce a laser beam;
   an electronic shutter, situated to intercept said laser beam, for opening for a predetermined amount of time in response to a trigger signal during each window to permit emission of a second laser pulse of predetermined duration, a plurality of second laser pulses thus being emitted by said shutter, each of said second laser pulses being emitted during the same respective window as a corresponding first laser pulse;
   an energy monitor for continuously monitoring the energy level produced by said laser beam source on a window by window basis, said monitor reporting said energy level observed during each of said windows as a respective energy report signal set for each of said windows, each energy report signal set including a plurality of fuzzy logic signals, each fuzzy logic signal exhibiting a predetermined logic state if the energy output of said laser is within a predetermined range assigned to such fuzzy logic signal, and
   a controller, coupled to said energy monitor, for generating said drive signal in response to said energy report signal, said drive signal including a plurality of drive pulses, the pulse width of each of said drive pulses being dependent on said energy report signal and being continuously updated in response to said energy report signal, said controller being coupled to said semiconductor laser source to provide said drive signal thereto to continuously control the width of the first laser pulses generated by said semiconductor laser source.

5. A method of operating a laser system comprising the steps of:
   driving a semiconductor laser source with a plurality of drive pulses to generate a plurality of first laser pulses, each pulse having a predetermined pulse width determined by a corresponding drive pulse, each first laser pulse occurring during a respective window;
   pumping a laser rod with said first laser pulses to generate a laser beam:
   opening an electronic shutter which intercepts said laser beam to permit a second laser pulse to be emitted during each window, said electronic shutter opening in response to a trigger signal;

continuously monitoring the laser energy output associated with each of said second laser pulses on a window by window basis to determine if said energy output exhibits a predetermined desired value, and adjusting the pulse width of successive drive pulses to control the pulse width of said first laser pulses and the energy output of corresponding respective second laser pulses.

6. A method of operating a laser system comprising the steps of:

driving a semiconductor laser source with a plurality of drive pulses to generate a plurality of first laser pulses, each pulse having a predetermined pulse width determined by a corresponding drive pulse, each first laser pulse occurring during a respective window;

pumping a laser rod with said first laser pulses to generate a laser beam:

opening an electronic shutter which intercepts said laser beam to permit a second laser pulse to be emitted during each window, said electronic shutter opening in response to a trigger signal;

continuously monitoring the laser energy output associated with each of said second laser pulses on a window by window basis to determine if said energy output exhibits a predetermined desired value;

reporting said energy output observed during each of said windows as a respective energy report signal set for each of said windows, each energy report signal set including a plurality of fuzzy logic signals, each fuzzy logic signal exhibiting a predetermined logic state if the energy output of said laser is within a predetermined different range assigned to each of said such fuzzy logic signals, and adjusting the pulse width of successive drive pulses in response to said energy report set to control the pulse width of said first laser pulses and the energy output of corresponding respective second laser pulses.

* * * * *